(12) United States Patent
Meinert et al.

(10) Patent No.: US 11,773,941 B2
(45) Date of Patent: Oct. 3, 2023

(54) HYDRAULIC VIBRATION DAMPER HAVING A REBOUND STOP AND A COMPRESSION STOP

(71) Applicants: ThyssenKrupp Bilstein GmbH, Ennepetal (DE); thyssenkrupp AG, Essen (DE)

(72) Inventors: Georg Meinert, Iserlohn (DE); Holger Hennen, Essen (DE); Klaus Schmidt, Odenthal (DE); Ole Götz, Braunschweig (DE)

(73) Assignees: THYSSENKRUPP BILSTEIN GMBH, Ennepetal (DE); THYSSENKRUPP AG, Essen (DE)

( * ) Notice: Subject to any disclaimer, the term of this patent is extended or adjusted under 35 U.S.C. 154(b) by 3 days.

(21) Appl. No.: 17/010,477

(22) Filed: Sep. 2, 2020

(65) Prior Publication Data

US 2021/0115998 A1    Apr. 22, 2021

(30) Foreign Application Priority Data

Sep. 12, 2019    (DE) .......................... 10 2019 213 913

(51) Int. Cl.
*F16F 9/49*    (2006.01)
*F16F 9/18*    (2006.01)
(Continued)

(52) U.S. Cl.
CPC .............. *F16F 9/49* (2013.01); *F16F 9/185* (2013.01); *F16F 9/3465* (2013.01);
(Continued)

(58) Field of Classification Search
CPC .. F16F 9/49; F16F 9/185; F16F 9/3465; F16F 9/3484; F16F 9/364; F16F 9/585;
(Continued)

(56) References Cited

U.S. PATENT DOCUMENTS

| 1,494,135 A | * | 5/1924 | Robison | .................. | F16F 9/185 |
| | | | | | 188/287 |
| 3,175,645 A | | 3/1965 | Schafer | | |

(Continued)

FOREIGN PATENT DOCUMENTS

| CN | 101529117 A | 9/2009 |
| CN | 108291604 A | 7/2018 |

(Continued)

OTHER PUBLICATIONS

Jörnsen Reimpell: Fahrwerktechnik: Stoß—und Schwingungsdämpfer (1989).

*Primary Examiner* — Xuan Lan Nguyen
(74) *Attorney, Agent, or Firm* — thyssenkrupp North America, LLC (57) ABSTRACT

A hydraulic vibration damper may include inner and outer tubes filled with damping liquid, a piston rod projecting axially out of the inner tube and movable in rebound and compression directions, a sealing and guide pack that sealingly closes an end of the outer tube and guides piston rod movement, a working piston for producing damping forces that is fastened to the piston rod and is guided on an inner lateral surface of the inner tube and subdivides the interior of the inner tube into a piston rod-side and piston rod-remote working spaces. The vibration damper has rebound and compression stops. In the piston rod-remote working space, a compression stop, starting from a predetermined retraction travel of the piston rod, may produce a travel- and speed-dependent compression stop force.

20 Claims, 4 Drawing Sheets

(51) Int. Cl.
*F16F 9/346* (2006.01)
*F16F 9/348* (2006.01)
*F16F 9/36* (2006.01)
*F16F 9/58* (2006.01)
*F16F 13/00* (2006.01)
*F16F 9/512* (2006.01)

(52) U.S. Cl.
CPC ............ *F16F 9/3484* (2013.01); *F16F 9/364* (2013.01); *F16F 9/585* (2013.01); *F16F 13/007* (2013.01); *F16F 9/512* (2013.01); *F16F 2222/12* (2013.01); *F16F 2224/025* (2013.01); *F16F 2224/0208* (2013.01); *F16F 2228/066* (2013.01); *F16F 2230/007* (2013.01); *F16F 2230/0052* (2013.01); *F16F 2230/30* (2013.01); *F16F 2232/08* (2013.01); *F16F 2234/02* (2013.01)

(58) Field of Classification Search
CPC .... F16F 9/512; F16F 2230/007; F16F 13/007; F16F 2222/12; F16F 2228/066; F16F 2230/0052; F16F 2230/30; F16F 2232/08; F16F 2234/02
USPC ......................................................... 188/315
See application file for complete search history.

(56) References Cited

U.S. PATENT DOCUMENTS

| | | | | |
|---|---|---|---|---|
| 4,312,499 A * | 1/1982 | Wossner | ................... | F16F 9/49 188/288 |
| 4,337,849 A * | 7/1982 | Siorek | ....................... | F16F 9/52 184/6.22 |
| 5,509,512 A * | 4/1996 | Grundei | .................. | F16F 9/516 188/315 |
| 6,681,906 B1 * | 1/2004 | Sasse | ........................ | F16F 9/49 188/282.6 |
| 2009/0120749 A1* | 5/2009 | Kolz | ......................... | F16F 9/46 188/322.19 |
| 2010/0133731 A1 | 6/2010 | Bantle et al. | | |
| 2015/0192187 A1* | 7/2015 | Smith | ....................... | F16F 9/49 188/284 |
| 2018/0355944 A1 | 12/2018 | Veltum et al. | | |

FOREIGN PATENT DOCUMENTS

| | | | | |
|---|---|---|---|---|
| DE | 1505360 A1 * | 3/1970 | ............... | F16F 9/49 |
| DE | 1430494 B1 * | 4/1970 | ............... | F16F 9/49 |
| DE | 27 51 488 A | 5/1979 | | |
| DE | 2751488 A * | 5/1979 | ............... | F16F 9/49 |
| DE | 28 06 540 A | 8/1979 | | |
| DE | 34 18 793 A1 | 11/1985 | | |
| DE | 199 08 606 C | 6/2000 | | |
| DE | 199 45 632 A | 4/2001 | | |
| DE | 102011017149 A1 * | 10/2012 | ............. | F16F 9/185 |
| ES | 2156791 A1 | 7/2001 | | |
| GB | 812 528 A | 4/1959 | | |
| GB | 941761 A | 11/1963 | | |
| GB | 2 008 716 A | 6/1979 | | |
| GB | 2158181 | 11/1985 | | |
| GB | 2199921 | 7/1988 | | |
| WO | 2015/105791 A | 7/2015 | | |

* cited by examiner

Fig. 2 (Detail X)

Fig. 5 (Detail Y)

Fig. 4

Fig. 6

HYDRAULIC VIBRATION DAMPER HAVING A REBOUND STOP AND A COMPRESSION STOP

CROSS REFERENCE TO RELATED APPLICATION

This application is a U.S. Non-Provisional Patent Application which claims priority to German Patent Application No. DE 10 2019 213 913.2, filed Sep. 12, 2019, the entire contents of which are incorporated herein by reference.

FIELD

The present disclosure generally relates to vibration dampers, including vibration dampers with rebound and compression stops.

BACKGROUND

One prior art vibration damper is disclosed in Laid-Open Document DE 28 06 540 A1. In this laid-open document, the inner tube is referred to as "cylinder" and provided with the reference sign "1" in the figures of the laid-open document. The rebound stop known from DE 28 06 540 A1 has a stop ring 10 which is fastened to the piston rod 2, a control sleeve 12 and a ring 11 which is arranged in the control sleeve 12. With a sufficiently large movement of the piston rod 2 in the rebound direction, that is to say with an extension movement of the piston rod 2 in the direction out of the cylinder 1, the control sleeve 12 and the ring 11 arranged therein are carried along in the rebound direction against the restoring force of the spring 14 by the stop ring 10 fastened to the piston rod 2. In the exemplary embodiment of a hydraulic rebound stop that is illustrated in FIG. 2 of the Laid-Open Document DE 28 06 540 A1, there are provided radial bores 18 which are arranged behind one another in the tube wall of the inner tube in the axial direction. The radial bores 18 open into an annular space which is formed by the outer jacket of the cylinder 1 and a sleeve 17 arranged on the outer surface of the cylinder 1. The ring 11 arranged in the control sleeve 12 travels successively over the radial bores 18 such that the free throughflow cross section which is defined by the radial bores is reduced in a stepwise manner. The damping liquid flows via the lowermost radial bore 18 out of the annular space between the cylinder 1 and sleeve 17 back into the piston rod-side working space 7. If the ring 11 has travelled over the uppermost radial bore 18 spaced furthest from the working piston 3, a slot provided in the ring and defining a constantly open throughflow cross section provides the passage cross section decisive for the hydraulic damping of the rebound stop. In this way there is achieved a travel-dependent increase in the rebound stop force with increasing extension travel of the piston rod.

A disadvantage with the vibration damper known from DE 28 06 540 A1 is that no additional damping force is produced starting from a certain retraction travel of the piston rod in the compression direction, that is to say into the cylinder. It is thus possible for undesired noise and reduced damping comfort to occur in the compression stage.

Thus a need exists for a vibration damper having improved damping comfort. In particular, the vibration damper is intended to have good damping comfort both in the rebound direction and in the compression direction in the region of the maximum retraction and extension travels of the piston rod and to generate no undesired noise. The damping force of the vibration damper is intended to be variable over the total available displacement travel of the piston rod.

DETAILED DESCRIPTION

Although certain example methods and apparatus have been described herein, the scope of coverage of this patent is not limited thereto. On the contrary, this patent covers all methods, apparatus, and articles of manufacture fairly falling within the scope of the appended claims either literally or under the doctrine of equivalents. Moreover, those having ordinary skill in the art will understand that reciting "a" element or "an" element in the appended claims does not restrict those claims to articles, apparatuses, systems, methods, or the like having only one of that element, even where other elements in the same claim or different claims are preceded by "at least one" or similar language. Similarly, it should be understood that the steps of any method claims need not necessarily be performed in the order in which they are recited, unless so required by the context of the claims. In addition, all references to one skilled in the art shall be understood to refer to one having ordinary skill in the art.

Figure 6:
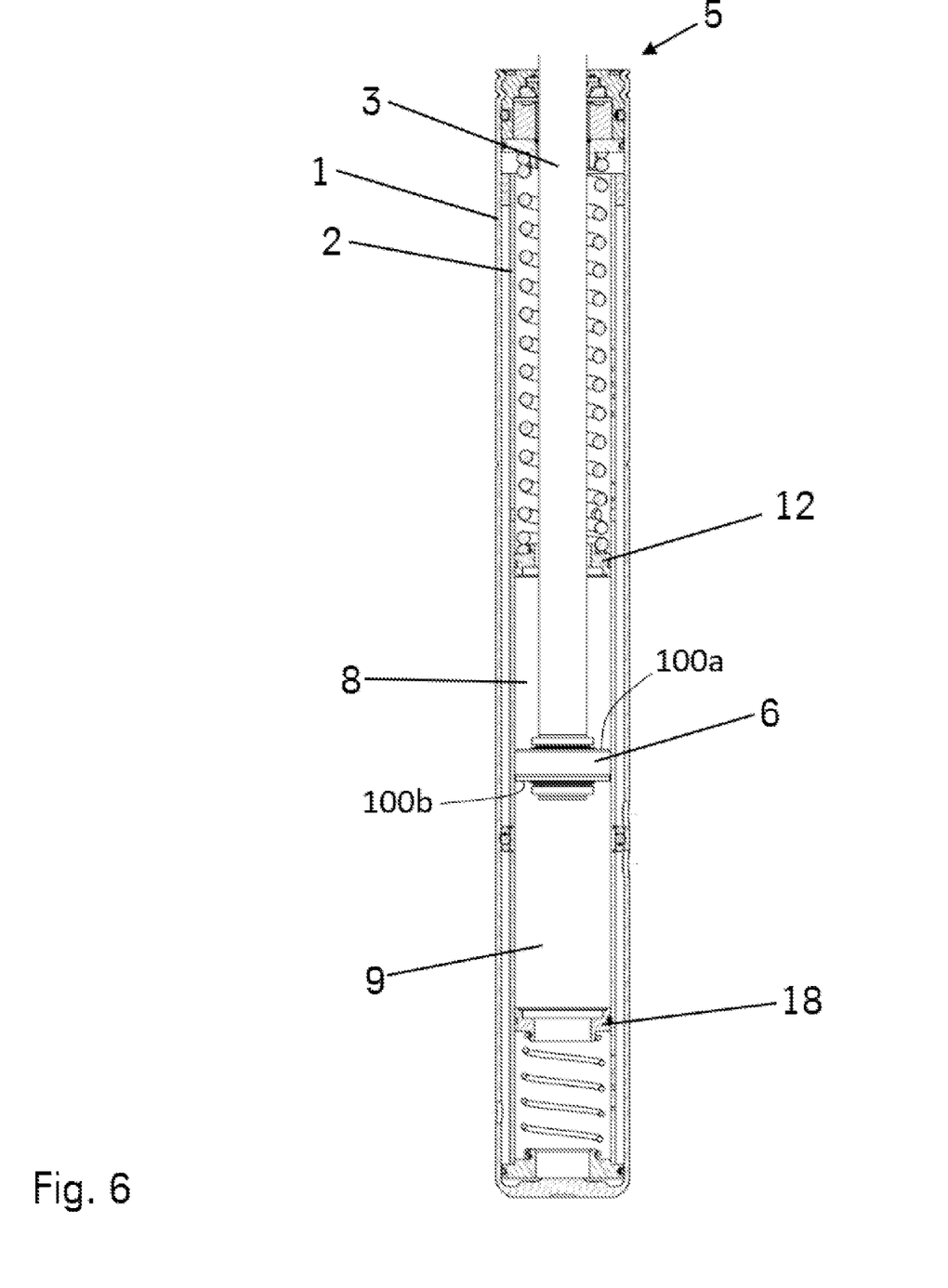

FIG. 6 is a schematic cross-sectional view through an example vibration damper that has a working piston with spring disc structures that are configured to engage auxiliary pistons.

In some examples, in the piston rod-remote working space there is provided a compression stop which, starting from a predetermined retraction travel of the piston rod, produces a travel- and speed-dependent compression stop force. A vibration damper is thus made available which, in addition to the damping force produced by the working piston, produces hydraulic stop forces both in the rebound direction and in the compression direction in the region of the maximum retraction and extension travels of the piston rod. This ensures good damping comfort and undesired noise in the region of the rebound and compression stop is avoided.

According to one embodiment of the invention, there is provision that the compression stop has a second support ring, which is fastened directly or indirectly to the piston rod at least in the axial direction, and a second auxiliary piston which is supported via a second spring, wherein the second auxiliary piston is guided in a contact region on the inner lateral surface of the inner tube, wherein, starting from a predetermined length of the piston rod movement in the compression direction, the second support ring carries along the second auxiliary piston in the compression direction against a spring force of the second spring, wherein the inner tube has a plurality of second radial bores arranged at a distance from one another in the axial direction, wherein the second radial bores define a second free throughflow cross section whose size can be reduced in a stepwise manner during a movement of the piston rod in the compression direction by the second auxiliary piston travelling successively over individual ones of the second radial bores with the production of a travel- and speed-dependently increasing compression stop force. In this embodiment, the compression stop is thus designed in a structurally comparable manner to the rebound stop.

According to one embodiment of the invention, the first auxiliary piston has a hollow cylindrical pot shape with a bottom, on which one end of the first spring is supported, and with a cylinder jacket which extends axially in the direction of the sealing and guide pack starting from the bottom, wherein the cylinder jacket is guided in a contact region, which is at a distance from the bottom, on the inner lateral surface of the inner tube. The pot-shaped auxiliary piston affords a length advantage. The first radial bores can be arranged by the use of the pot piston in the so-called solid height region of the first spring (that is to say the rebound stop spring), that is to say in a region of the inner tube over which there cannot travel a disc-shaped auxiliary piston which barely extends in the axial direction. The first radial bores can thus be arranged in the axial direction so as to be spaced apart from the working piston of the vibration damper to such an extent that the working piston with its piston guide element (for example in the case of a working piston with the design of a "banded piston" or of a working piston with a piston film) does not have to travel over the first radial bores during spring compression and rebound. A situation can thus be avoided in which the guide element of the working piston is damaged by the first radial bores.

According to one embodiment of the invention, a spacer element is arranged in the piston rod-remote working space, wherein the spacer element is connected to the piston rod, and the second support ring is fastened to the spacer element. In the compression stage it is in this way possible to prevent damage to the piston guide element of the working piston through the choice of the axial length of the spacer element, because the working piston with its piston guide element (banded piston; piston film) can be prevented from having to travel over the second radial bores during spring compression and rebound and possibly being damaged in the process. Here, the spacer element is arranged in the piston rod-remote working space preferably between the working piston and the second support ring.

According to one embodiment of the invention, the inner tube has at least one overflow passage via which the piston rod-side working space is hydraulically connected to a damping force adjustment device. For this purpose, the damping force adjustment device, for example as an external valve device, can be flanged on the outside of the outer tube of the vibration damper. The external valve device is hydraulically connected via throughflow bores in the outer tube to the annular space formed between the inner tube and outer tube of the vibration damper. By virtue of the damping force adjustment device, the damping force of the vibration damper can be varied steplessly or corresponding to predetermined discrete damping force characteristics. It is thus possible for example for soft damping force profiles which impart a comfortable driving sensation to be set in a movement region of the working piston that extends upwardly and downwardly from a central position of the working piston in the axial direction and with which there then dovetail the additional damping forces of the rebound and compression stop in the end regions of the working piston movement. The damping forces of the rebound and compression stop in the end regions of the working piston movement can be coordinated with the damping forces which are produced by the damping force adjustment device in such a way that a harmonic damping force profile results over the total axial movement region of the working piston. This makes it possible for example to achieve a particularly comfortable damping force profile over the total working piston movement region.

If the first auxiliary piston is designed as a pot piston, a hydraulic separation between the at least one overflow passage and the first radial bores of the rebound stop can be realized. Here, the pot-shaped first auxiliary piston can have, at its end facing away from the bottom of the pot piston, a sealing element which interacts with the inner wall of the inner tube in a sealing manner. The at least one overflow passage is then arranged in a region between this sealing element and the bottom of the first auxiliary piston, whereas the first radial bores are arranged in a region between this sealing element and the sealing and guide pack of the vibration damper. This ensures that a movement of the first auxiliary piston of the rebound stop has no influence on the damping force which is produced by the damping force adjustment device. A clear functional separation of the hydraulic rebound stop on the one hand and the damping force adjustment device on the other hand is thus achieved. The two devices (rebound stop and damping force adjustment device) can be designed independently of one another and in an optimized manner for their respective function. This further increases the constructional possibilities of realizing an optimized damping force profile over the total axial working piston movement region.

According to one embodiment of the invention, the piston rod-side working space and the piston rod-remote working space are connected via at least one overflow passage to an annular space formed between the inner tube and the outer tube, wherein the outer tube has connecting passages via which the damping force adjustment device arranged outside the working spaces is hydraulically connected to the annular space. In this way, the damping force adjustment device (for example as a piggyback valve device) can be flanged onto the outer tube from outside.

According to one embodiment of the invention, at least one of the support rings has a spring disc pack which consists of at least one spring disc and which, at a predeterminable opening pressure, opens a flow passage running through the support ring. This makes it possible to limit the pressure in the chambers between the combination of first support ring/first auxiliary piston and sealing and guide pack in the rebound stage or between the combination of second support ring/second auxiliary piston and damper bottom/ bottom element. This has the advantage that inadmissibly high damping forces are prevented in the rebound stop and in the compression stop.

According to one embodiment of the invention, there is provision that the support rings are integrated into a spring disc structure of the working piston such that components of the spring disc structure that are arranged in the piston rod-side working space, starting from a predeterminable length of the piston rod movement in the rebound direction, carry along the first auxiliary piston in the rebound direction, or components of the spring disc structure which are arranged in the piston rod-remote working space, starting from a predeterminable length of the piston rod movement in the compression direction, carry along the second auxiliary piston in the compression direction. In this embodiment, the function of the support rings is performed by the spring disc structure of the working piston. The function of the first support ring is performed by the spring disc pack of the working piston that is arranged in the piston rod-side working space. The function of the second support ring is performed by the spring disc pack of the working piston that is arranged in the piston rod-remote working space. In this embodiment of the invention, the working piston travels over the first radial bores in the rebound stage and over the second radial bores in the compression stage. This embodiment of the invention achieves a design of maximum compactness that has the smallest installation space requirement in the axial direction. It is possible in this way to realize a vibration damper according to the invention which is minimized in terms of its axial installation length.

Figure 1:
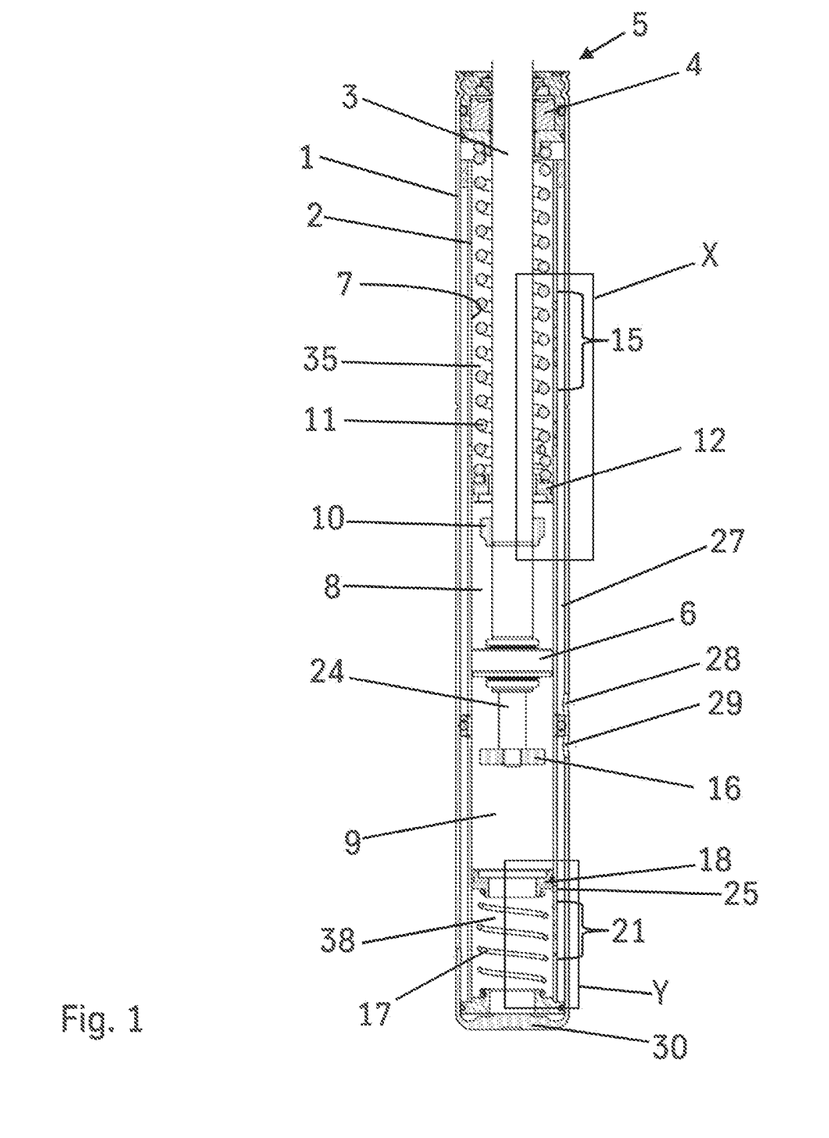
FIG. 1 is a schematic view of a first example vibration damper.

FIG. 1 illustrates a first embodiment of the invention. FIG. 1 shows a vibration damper configured according to the invention in an axial half section. The vibration damper has an outer tube and an inner tube 2, wherein the inner tube 2 is arranged coaxially within the outer tube 1. At the upper end 5 of the outer tube 1 in FIG. 1 there is arranged a sealing and guide pack 4 which sealingly closes the interior of the outer tube 1 with respect to the surroundings. The sealing and guide pack 4 has a central opening through which a piston rod 3 is guided. At its end situated at a distance from the sealing and guide pack 4, the piston rod 3 bears a working piston 6. The working piston 6 is guided by the inner lateral surface 7 of the inner tube 2. The piston rod 3 is arranged movably in the axial direction such that it can dip in an oscillating manner into the inner tube 2 (this is the so-called compression direction of the piston rod movement) or can move out of the inner tube 2 (this is the so-called rebound direction of the piston rod movement).

The working piston 6 subdivides the interior of the inner tube 2 into a piston rod-side working space 8 and a piston rod-remote working space 9. In the piston rod-side working space 8 there is arranged a rebound stop which, starting from a predetermined extension travel of the piston rod 3, in interaction with first radial bores 15 arranged in the inner tube 2, produces a travel-dependent hydraulic rebound stop force.

The rebound stop has a first support ring 10 which is fastened to the piston rod 3 in such a way that it is fixed at least in the axial direction, that is to say cannot move in the axial direction relative to the piston rod 3. Furthermore, the rebound stop has a first auxiliary piston 12 which is supported on the sealing and guide pack 4 via a first spring 11 (which is also referred to as a rebound stop spring). In the exemplary embodiment illustrated, the first spring 11 is designed as a helical compression spring made of steel. However, other embodiments of the first spring 11, for example as resilient plastics elements, are equally conceivable.

The first auxiliary piston 12 is guided in a contact region on the inner lateral surface 7 of the inner tube 2. Starting from a design-dependent length of the piston rod movement in the rebound direction, the first support ring 10 carries along the first auxiliary piston 12 in the rebound direction against the spring force of the first spring 11, that is to say that the first support ring 10 bears against the auxiliary piston 12 starting from a defined extension travel of the piston rod 3, and the combination of the first support ring 10 and first auxiliary piston 12 moves further in the rebound direction with compression of the first spring 11. In the region between the sealing and guide pack 4 and the position in which the auxiliary piston 12 is situated with the first spring 11 relaxed, first radial bores 15 are arranged in the tube wall of the inner tube 2. As viewed in the axial direction, the first radial bores 15 are arranged behind one another, that is to say at a distance from one another, with the result that the auxiliary piston 12 travels successively over these radial bores 15 during an extension movement of the piston rod 3. This successive travel over the radial bores 15 causes the free total throughflow cross section of the first radial bores 15 to be reduced in a stepwise manner, that is to say, for the damping medium (for example hydraulic oil) enclosed between the auxiliary piston 12 and the sealing and guide pack 4, there is a stepwise reduction in the remaining free throughflow cross section through which the damping medium can flow out of the interior of the inner tube 2 into the annular space 27 between the outer tube 1 and inner tube 2. This reduction in the free throughflow cross section leads to an increase in the flow resistance for the damping medium, with the result that the damping force produced by the flow through the first radial bores 15 increases in a stepwise manner. For this reason, the variation in the rebound stop force is referred to as travel-dependent, since the level of the rebound stop force depends on the travel which the auxiliary piston 12 has taken in the rebound direction (that is to say during an extension movement of the piston rod 3 out of the inner tube 2). The rebound stop force produced by the rebound stop is additionally also speed-dependent, because the radial bores 15 act like hydraulic orifices and the pressure drop, which occurs during the flow through the radial bores 15 and which is crucial for the thus produced damping force, increases with increasing throughflow speed.

According to the invention, there is arranged in the piston-remote working space 9 a compression stop which, starting from a design-dependent retraction travel of the piston rod 3, produces a travel- and speed-dependent compression stop force. The compression stop is here preferably designed in such a way that the compression stop force produced is well-harmonized with the damping force produced by the working piston and/or the damping force production device. In particular, the compression stop is designed in such a way that no abrupt jumps in the damping force profile occur. This is achieved for example when, at the time at which the working piston 6 has moved so far in the compression direction that the compression stop becomes active, that is to say the second spring 17 is compressed and a compression stop force is produced, the damping force produced by the compression stop is not abruptly larger or smaller than the damping force produced by the working piston 6 or the damping force production device. The measures which can be used to influence the damping force produced by the compression stop in a targeted manner will be explained below.

The compression stop in the piston rod-remote working space 9 has a second support ring 16 which is fastened directly or indirectly to the piston rod 3 at least in the axial direction. Here, "fastened directly or indirectly at least in the axial direction" means that the second support ring 16 is fastened to the piston rod 3 in such a way that it cannot move relative to the piston rod 3 at least in the axial direction (a rotational relative movement with respect to the piston rod 3 would by contrast be by all means permissible), and that the support ring 16 can have either direct contact with the piston rod 3 or that one or more further components can be arranged between the support ring 16 and the piston rod 3.

The compression stop also has a second auxiliary piston 18. The second auxiliary piston 18 is supported on the damper bottom 30 via a second spring 17. The second auxiliary piston 18 is guided in a contact region on the inner lateral surface 7 of the inner tube 2. The axial positions of the second support ring 16 and of the second auxiliary piston 18 are coordinated with one another in such a way that, starting from a predetermined length of the piston rod movement in the compression direction, the second support ring 16 carries along the second auxiliary piston 18 in the compression direction against the spring force of the second spring 17. The second support ring 16 then bears against the second auxiliary piston 18, and the two components move further in the compression direction with compression of the second spring 17. In the exemplary embodiment illustrated in FIG. 1, the setting of the axial position of the second support ring 16 relative to the axial position of the second auxiliary piston 18 is achieved by means of a spacer element 24. The spacer element 24 is arranged in the piston rod-remote working space and fastened to the piston rod 3. At its end facing away from the working piston 6, the spacer element 24 bears the second support disc 18. Through the choice of the length of the spacer element 24 it can be determined from which displacement travel of the piston rod 3 the action of the compression stop is intended to set in.

The inner tube 2 has a plurality of second radial bores 21 which are arranged at a distance from one another in the axial direction and which connect the piston rod-remote working space 9 in the region between the second auxiliary piston 18 and the damper bottom 30 to the annular space 27 which is formed between the inner tube 2 and the outer tube 1. The second radial bores 21 together define a second free throughflow cross section for the damping medium. The second auxiliary piston 18 moving in the compression direction successively travels over the second radial bores 21 arranged at a distance from one another in the axial direction. Each time when the second auxiliary piston 18 travels over a second radial bore 21 or a plurality of second radial bores 21 which are arranged in the same radial plane and distributed over the circumference of the inner tube 2, the free throughflow cross section of the compression stop is reduced in a stepwise manner. The damping force of the compression stop that is produced by the remaining free throughflow cross section correspondingly increases. As described above in relation to the rebound stop force of the rebound stop, the compression stop force produced by the compression stop is therefore also, on the one hand, travel-dependent, that is to say dependent on the displacement travel of the piston rod 3, and, on the other hand, speed-dependent on account of the orifice action of the second radial bores 21.

Figure 5:
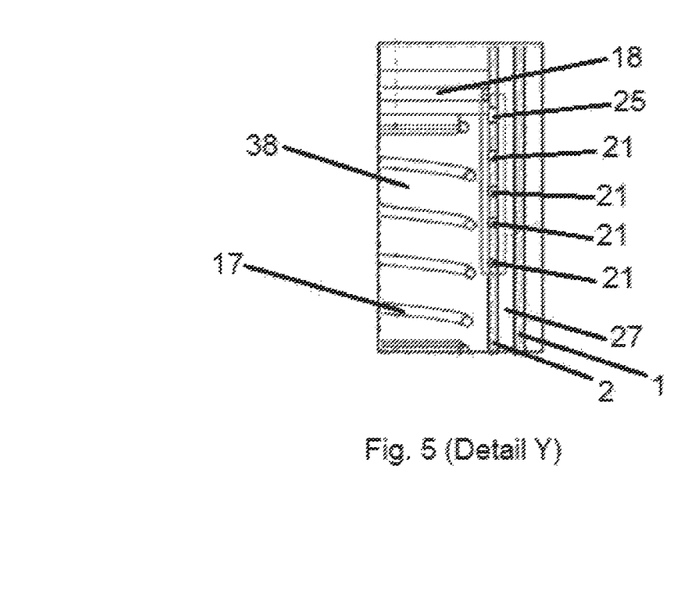
FIG. 5 is a schematic view of the detail Y from FIG. 1.

FIG. 5 illustrates the compression stop according to FIG. 1 in a detail view Y. The second spring 17 supports the second auxiliary piston 18. The overflow passage 25 connects the piston rod-remote working space 9 to the annular space 27 and thus to the damping force adjustment device (not shown). The second radial bores 21 are arranged behind one another in the axial direction and the second auxiliary piston 18 successively travels over them during a sufficiently large movement of the piston rod 3 in the compression direction. The free throughflow cross section of the compression stop is reduced in a stepwise manner as a result.

In the exemplary embodiment illustrated in FIG. 1, the first auxiliary piston 12 is designed as a compact, relatively flat disc with a small axial extent. This embodiment of the first auxiliary piston 12 can be referred to as a "compact piston" given its small axial installation height. However, other designs of the first auxiliary piston 12 are also conceivable, as will be explained below on the basis of FIG. 2.

In the outer tube 1 there are arranged connecting passages 28, 29 which are designed as bores and which connect the annular space 27 to a damping force adjustment device (for example flanged from outside onto the outer tube 1) that is not illustrated. The piston rod-side working space 8 and the piston rod-remote working space 9 are connected to the annular space 27 by overflow passages 25 arranged in the wall of the inner tube 2, with the result that the working spaces 8, 9 are hydraulically connected to the damping force adjustment device via the annular space 27.

Figure 2:
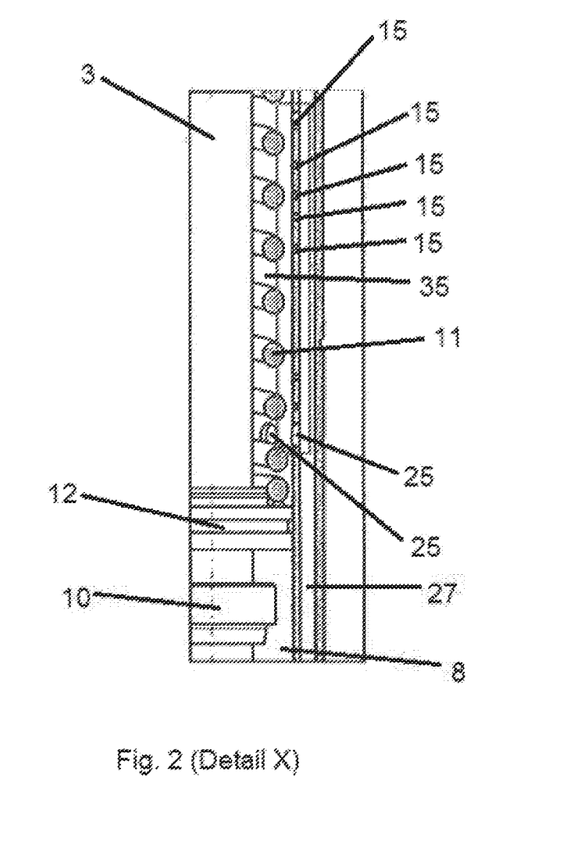
FIG. 2 is a schematic view of the detail X from FIG. 1.

FIG. 2 illustrates the detail X from FIG. 1 on an enlarged scale. The piston rod 3 bears the first support ring 10. The first auxiliary piston 12 is arranged spaced apart from the first support ring 10 in the axial direction. The first auxiliary piston 12 is arranged so as to be movable relative to the piston rod 3 in the axial direction. The first spring 11 is supported on the first auxiliary piston 12. The wall of the inner tube 2 has first radial bores 15 which are arranged at a distance from one another in the axial direction, that is to say behind one another in the movement direction of the auxiliary piston 12. If the piston rod 3 moves in the rebound direction, that is to say upwardly in FIG. 2, the first support ring 10 bears against the first auxiliary piston 12 after a certain displacement travel and carries it along. The first spring 11 is compressed and the combination of the first support ring 10 and first auxiliary piston 12 moves in the direction of the sealing and guide pack 4 (not shown in FIG. 2). The first auxiliary piston 12 is guided on the inner lateral surface 7 of the inner tube 2. The first auxiliary piston 12 provided in the exemplary embodiment illustrated has its lateral surface bearing sealingly against the inner lateral surface of the inner tube 2 by way of a piston film (not shown).

The first radial bores 15 together define a free throughflow cross section through which the damping medium (for example a hydraulic oil) displaced by the first auxiliary piston 12 can flow into the annular space 27 enclosing the inner tube 2 and formed between the outer tube 1 and the inner tube 2. During this flow through the first radial bores 15 there is produced a damping force, which is also referred to as rebound stop force. Every time when the first auxiliary piston 12 travels over a first radial bore 15 or a plurality of first radial bores 15 arranged in the same radial plane and distributed over the circumference of the inner tube 2, there is a reduction in the remaining free throughflow cross section which is available to the damping medium displaced by the first auxiliary piston 12 for throughflow. Consequently, the flow resistance of the rebound stop increases in a travel-dependent manner with increasing displacement travel of the first auxiliary piston 12, and the rebound stop force correspondingly increases. When the first spring 11 is compressed to solid height, hydraulic damping force is no longer produced by the rebound stop.

There are various design possibilities both in the rebound stop and in the compression stop to design the rebound stop force or the compression stop force in such a way that the total damping force profile over the total possible length of the piston rod movement runs as harmonically as possible and without abrupt damping force variations. The damping force profiles which are produced by the rebound or compression stop are influenced in particular by the size of the first radial bores 15 or second radial bores 21;

the distance between the first radial bores 15 or second radial bores 21 in the axial direction;

the spring stiffness of the first spring 11 or second spring 17;

the axial distance between the first support ring 10 and the first auxiliary piston 12 or between the second support ring 16 and the second auxiliary piston 18.

By suitably determining these design parameters it is possible for the damping force profiles which are produced by the rebound stop and the compression stop to be adapted and tailored to the damping force profile which is produced by the working piston 6 and/or the damping force adjustment device. In particular, the damping forces produced by the rebound stop can thus be tailored to the damping forces which are produced by the working piston and/or by the damping force production device during a rebound stage movement of the piston rod 3 outside of the action region of the rebound stop. Here, the tailoring can in particular occur in such a way that no abrupt damping force variations result when the rebound stop is active and produces an additional damping force. Analogously, the damping forces produced by the compression stop can be tailored to the damping forces which are produced by the working piston and/or by the damping force production device during a compression stage movement of the piston rod 3 outside of the action region of the compression stop. Here, the tailoring can in particular occur in such a way that no abrupt damping force variations result when the compression stop is active and produces an additional damping force.

Figure 3:
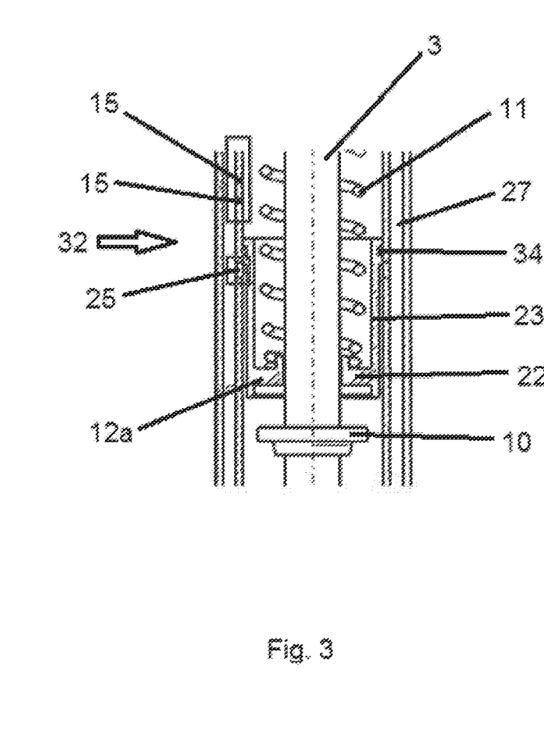
FIG. 3 is a schematic view of a second example vibration damper.

FIG. 3 illustrates a second embodiment of the present invention. The embodiment according to FIG. 3 differs from that of FIGS. 1 and 2 in that, instead of a compact, disc-shaped first auxiliary piston 12, use is made of a first auxiliary piston 12a having a hollow cylindrical pot shape (also referred to as "pot piston"). The first auxiliary piston/pot piston 12a according to FIG. 3 has a bottom 22 starting from which a hollow cylindrical wall 23 extends in the axial direction in the direction of the sealing and guide pack 4. The end 32 of the pot piston 12a that is opposite to the bottom 22 has on its outer lateral surface 33 a seal 34 which bears sealingly against the inner lateral surface 7 of the inner tube 2. This configuration of the first auxiliary piston 12a allows the first radial bores 15 of the hydraulic rebound stop to be hydraulically separated from the overflow passage 25 by which the piston rod-side working space 8 is connected to the annular space 27. As a result, a movement of the first auxiliary piston 12a in the rebound direction does not cause any flow of damping medium displaced by the first auxiliary piston 12a through the overflow passage 25, but flow passes exclusively through the first radial bores 15. This hydraulic separation is advantageous because a clear functional separation of the hydraulic rebound stop on the one hand and the damping force adjustment device on the other hand is achieved as a result.

In addition, the embodiment of the first auxiliary piston 12a as a pot piston according to FIG. 3 leads to advantages with respect to the installation length. By virtue of the first auxiliary piston 12a being designed as a pot piston, the first radial bores 15 can be arranged in a region of the wall of the inner tube 2 that surrounds the first spring 11 in its state in which it is moved to solid height. The first spring 11 is at least partially accommodated by the hollow cylindrical part of the pot piston. As a result, the first radial bores 15 can be displaced in the axial direction substantially further in the direction of the sealing and guide pack 4 than with a design of the first auxiliary piston 12 as a disc-shaped compact piston. In particular, the advantage is thereby afforded that the working piston 6 of the vibration damper does not have to have its piston guide element (banded piston; piston film) bearing against the inner lateral surface 7 of the inner tube 2 travel over the overflow passage 25 and the first radial bores 15 during spring compression and rebound. Any damage to the piston guide element and/or to the working piston 6 can be prevented as a result. By comparison with an embodiment of the first auxiliary piston 12 as a compact piston, it is possible, for the same stroke of the piston rod, to achieve a smaller installation length of the vibration damper with the same effectiveness of the rebound stop.

Figure 4:
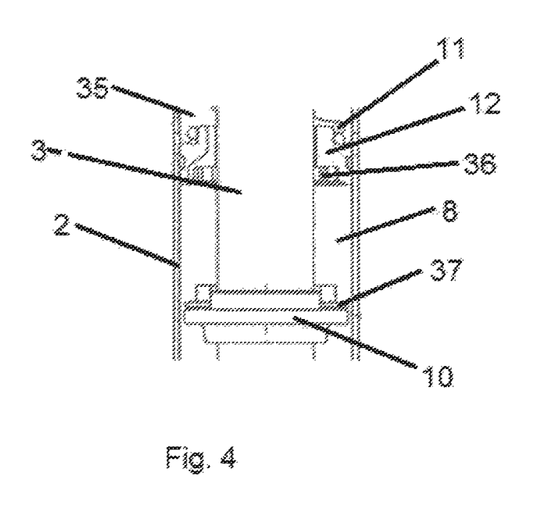
FIG. 4 is a schematic view of a third example vibration damper.

FIG. 4 shows an embodiment of the invention in which the rebound stop is equipped with a pressure-limiting function. To achieve better clarity, only the inner tube 2, the piston rod 3, the first support disc 10 and the first auxiliary piston 12 are illustrated. To achieve the pressure-limiting function, the first support ring 10 has a spring disc pack 37 which consists of one or more spring discs. The spring disc pack 37 opens at a predetermined pressure in the rebound stop space 35, that is to say in the annular space 35 which is enclosed between the sealing and guide pack 4 and the first auxiliary piston 12 and in which the first spring 11 is also arranged. If the first support ring 10 has come to bear against the first auxiliary piston 12 during a piston rod movement in the rebound direction and the support ring 10/auxiliary piston 12 combination moves further in the rebound direction, the pressure in the annular space/rebound stop space 35 increases further. The first auxiliary piston 12 has passages 36 which traverse the first auxiliary piston 12 in the axial direction. Starting from a certain pressure level, damping medium flows out of the rebound stop space 35 via these passages 36 in the direction of the piston rod-side working space 8. Here, the damping medium is applied to the spring disc pack 37 of the first support ring 10. Once the pressure acting on the spring disc pack 37 reaches the opening pressure of the spring disc pack 37, the spring disc pack 37 opens and the damping medium flows into the piston rod-side working space 8. In this way, the pressure in the rebound stop space 35 is limited and a situation is prevented in which the pressure in the rebound stop space 35 can increase above a critical amount. It is thus possible for example for bursting of the damper as a result of an excessive pressure in the rebound stop space 35 to be prevented.

According to the invention, the above-described pressure-limiting function can also be provided in the compression stop in an analogous manner, that is to say that the pressure in the compression stop space 38 which is enclosed between the second auxiliary piston 18 and the damper bottom 30 can, just as described above for the rebound stop, be limited by virtue of the fact that the second support ring 16 is equipped with a spring disc pack which opens from a certain opening pressure.

In some embodiments, such as that shown in FIG. 6, the support rings are integrated into a spring disc structure 100a, 100b of the working piston 6 such that components of the spring disc structure 100a that are arranged in the piston rod-side working space 8, starting from a predeterminable length of the piston rod movement in the rebound direction, carry along the first auxiliary piston 12 in the rebound direction, or components of the spring disc structure 100b that are arranged in the piston rod-remote working space 9, starting from a predeterminable length of the piston rod movement in the compression direction, carry along the second auxiliary piston 18 in the compression direction. In such embodiments, the function of the support rings mentioned further above is performed by the spring disc structure 100a, 100b of the working piston 6. The function of the first support ring is performed by the spring disc pack 100a of the working piston 6 that is arranged in the piston rod-side working space 8. The function of the second support ring is performed by the spring disc pack 100b of the working piston 6 that is arranged in the piston rod-remote working space 9. In embodiments like these, the working piston 6 may travel over first radial bores in the rebound stage and over second radial bores in the compression stage.

LIST OF REFERENCE SIGNS

1 Outer tube
2 Inner tube

3 Piston rod
4 Sealing and guide pack
5 End
6 Working piston
7 Inner lateral surface
8 Piston rod-side working space
9 Piston rod-remote working space
10 First support ring
11 First spring
12 First auxiliary piston
12a First auxiliary piston; pot piston
15 First radial bores
16 Second support ring
17 Second spring
28 connecting passages
29 connecting passages
30 Damper bottom
32 End
33 Outer lateral surface
34 Seal
35 Annular space; rebound stop space
36 Passage; passages
37 Spring disc pack
38 Compression stop space

What is claimed is:

1. A hydraulic vibration damper comprising:
an outer tube and an inner tube that are filled with damping liquid, wherein the inner tube includes first radial bores that are spaced apart from one another in an axial direction;
a piston rod disposed in the inner tube so as to be movable in a rebound direction and in a compression direction, the piston rod projecting out of the outer tube in the axial direction;
a sealing and guide pack that sealingly closes an end of the outer tube and guides piston rod movement in the rebound and compression directions;
a working piston for producing damping forces, the working piston being fastened to the piston rod and guided on an inner lateral surface of the inner tube, wherein the working piston subdivides an interior of the inner tube into a piston rod-side working space and a piston rod-remote working space;
a rebound stop disposed in the piston rod-side working space, wherein the rebound stop starting from a predetermined extension travel of the piston rod produces a travel-dependent rebound stop force, wherein the rebound stop comprises:
 a first auxiliary piston that is supported via a first spring, wherein the first auxiliary piston is guided on the inner lateral surface of the inner tube, wherein starting from a predetermined length of piston rod movement in the rebound direction a first spring disc structure of the working piston carries along the first auxiliary piston in the rebound direction against a spring force of the first spring, wherein the first radial bores define a first free throughflow cross section whose size is configured to be reduced in a defined manner during movement of the piston rod in the rebound direction by the first auxiliary piston traveling successively over individual bores of the first radial bores with production of a travel-dependently and speed-dependently increasing rebound stop force, wherein the first auxiliary piston has a hollow cylindrical pot shape with a bottom on which an end of the first spring is supported, and with a cylinder jacket that extends axially in a direction of the sealing and guide pack starting from the bottom, wherein the cylinder jacket is guided in a first contact region, which is spaced apart from the bottom, on the inner lateral surface of the inner tube; and
a compression stop disposed in the piston rod-remote working space, wherein starting from a predetermined retraction travel of the piston rod the compression stop produces a travel- and speed-dependent compression stop force, wherein the compression stop comprises:
 a second auxiliary piston that is supported via a second spring, wherein the second auxiliary piston is guided in a second contact region on the inner lateral surface of the inner tube, wherein starting from a predetermined length of piston rod movement in the compression direction a second spring disc structure of the working piston carries along the second auxiliary piston in the compression direction against a spring force of the second spring, wherein the inner tube includes second radial bores that are spaced apart from one another in the axial direction, wherein the second radial bores define a second free throughflow cross section whose size is configured to be reduced in a stepwise manner during movement of the piston rod in the compression direction by the second auxiliary piston traveling successively over individual bores of the second radial bores with production of a travel-dependently increasing compression stop force;
a connecting passage located on the outer tube configured to connect an annular space disposed between the inner tube and the outer tube to a damping force adjustment device, wherein the damping liquid displaced by the first auxiliary piston flows into the annular space directly through the first radial bores and is communicated directly to the connecting passage.

2. The hydraulic vibration damper of claim 1 wherein the inner tube includes an overflow passage via which the piston rod-side working space is hydraulically connected to a damping force adjustment device.

3. The hydraulic vibration damper of claim 2 wherein the piston rod-side working space and the piston rod-remote working space are connected via the overflow passage to the annular space disposed between the inner tube and the outer tube, wherein the outer tube has connecting passages via which the damping force adjustment device, which is disposed outside the working spaces, is hydraulically connected to the annular space.

4. The hydraulic vibration damper of claim 1 wherein the first a spring disc structure is configured to open a flow passage at a predeterminable opening pressure.

5. The hydraulic vibration damper of claim 1 wherein the second spring disc structure is configured to open a flow passage at a predeterminable opening pressure.

6. A hydraulic vibration damper comprising:
an outer tube and an inner tube that are filled with damping liquid, wherein the inner tube includes first radial bores that are spaced apart from one another in an axial direction;
a piston rod disposed in the inner tube so as to be movable in a rebound direction and in a compression direction, the piston rod projecting out of the outer tube in the axial direction;
a sealing and guide pack that sealingly closes an end of the outer tube and guides piston rod movement in the rebound and compression directions;
a working piston for producing damping forces, the working piston being fastened to the piston rod and guided on an inner lateral surface of the inner tube, wherein the working piston subdivides an interior of the inner tube into a piston rod-side working space and a piston rod-remote working space;

a rebound stop disposed in the piston rod-side working space, wherein the rebound stop starting from a predetermined extension travel of the piston rod produces a travel-dependent rebound stop force, wherein the rebound stop comprises:

a first auxiliary piston that is supported via a first spring, wherein the first auxiliary piston is guided in a first contact region on the inner lateral surface of the inner tube, wherein starting from a predetermined length of piston rod movement in the rebound direction a first spring disc structure of the working piston carries along the first auxiliary piston in the rebound direction against a spring force of the first spring, wherein the first radial bores define a first free throughflow cross section whose size is configured to be reduced in a defined manner during movement of the piston rod in the rebound direction by the first auxiliary piston traveling successively over individual bores of the first radial bores with production of a travel-dependently and speed-dependently increasing rebound stop force, wherein a cylindrical sidewall of the first auxiliary piston is radially spaced apart from the piston rod and has a greater longitudinal extent than an outer diameter of a portion of the first auxiliary piston that is configured to engage with the first spring disc structure of the working piston; and a compression stop disposed in the piston rod-remote working space, wherein starting from a predetermined retraction travel of the piston rod the compression stop produces a travel- and speed-dependent compression stop force, wherein the compression stop comprises:

a second auxiliary piston that is supported via a second spring, wherein the second auxiliary piston is guided in a second contact region on the inner lateral surface of the inner tube, wherein starting from a predetermined length of piston rod movement in the compression direction a second spring disc structure of the working piston carries along the second auxiliary piston in the compression direction against a spring force of the second spring, wherein the inner tube includes second radial bores that are spaced apart from one another in the axial direction, wherein the second radial bores define a second free throughflow cross section whose size is configured to be reduced in a stepwise manner during movement of the piston rod in the compression direction by the second auxiliary piston traveling successively over the second radial bores with production of a travel-dependently increasing compression stop force;

a connecting passage located on the outer tube configured to connect an annular space disposed between the inner tube and the outer tube to a damping force adjustment device, wherein the damping liquid displaced by the first auxiliary piston flows into the annular space directly through the first radial bores and is communicated directly to the connecting passage.

7. The hydraulic vibration damper of claim 6 wherein the inner tube includes an overflow passage via which the piston rod-side working space is hydraulically connected to a damping force adjustment device.

8. The hydraulic vibration damper of claim 7 wherein the piston rod-side working space and the piston rod-remote working space are connected via the overflow passage to the annular space disposed between the inner tube and the outer tube, wherein the outer tube has connecting passages via which the damping force adjustment device, which is disposed outside the working spaces, is hydraulically connected to the annular space.

9. A hydraulic vibration damper comprising:

an outer tube and an inner tube that are filled with damping liquid, wherein the inner tube includes first radial bores that are spaced apart from one another in an axial direction;

a piston rod disposed in the inner tube so as to be movable in a rebound direction and in a compression direction, the piston rod projecting out of the outer tube in the axial direction;

a working piston for producing damping forces, the working piston being fastened to the piston rod and guided on an inner lateral surface of the inner tube, wherein the working piston subdivides an interior of the inner tube into a piston rod-side working space and a piston rod-remote working space;

a rebound stop disposed in the piston rod-side working space, wherein the rebound stop starting from a predetermined extension travel of the piston rod produces a rebound stop force, wherein the rebound stop comprises:

a first auxiliary piston that is guided on the inner lateral surface of the inner tube, wherein starting from a predetermined length of piston rod movement in the rebound direction a first spring disc structure of the working piston carries along the first auxiliary piston in the rebound direction, wherein the first radial bores define a first free throughflow cross section whose size is configured to be reduced during movement of the piston rod in the rebound direction by the first auxiliary piston traveling successively over the first radial bores with production of the rebound stop force, wherein a cylindrical sidewall of the first auxiliary piston is radially spaced apart from the piston rod and has a greater longitudinal extent than an outer diameter of a portion of the first auxiliary piston that is configured to engage with the first spring disc structure of the working piston; and a compression stop disposed in the piston rod-remote working space, wherein starting from a predetermined retraction travel of the piston rod the compression stop produces a compression stop force, wherein the compression stop comprises:

a second auxiliary piston that is guided in a second contact region on the inner lateral surface of the inner tube, wherein starting from a predetermined length of piston rod movement in the compression direction a second spring disc structure of the working piston carries along the second auxiliary piston in the compression direction, wherein the inner tube includes second radial bores that are spaced apart from one another in the axial direction, wherein the second radial bores define a second free throughflow cross section whose size is configured to be reduced during movement of the piston rod in the compression direction by the second auxiliary piston traveling successively over the second radial bores with production of the compression stop force;

a connecting passage located on the outer tube configured to connect an annular space disposed between the inner tube and the outer tube to a damping force adjustment device, wherein the damping liquid displaced by the first auxiliary piston flows into the annular space directly through the first radial bores and is communicated directly to the connecting passage.

10. The hydraulic vibration damper of claim 9 wherein the first auxiliary piston has a hollow cylindrical pot shape with a bottom on which an end of a first spring is supported, and with a cylinder jacket that extends axially in a direction of a sealing and guide pack starting from the bottom, wherein the cylinder jacket is guided in a first contact region, which is spaced apart from the bottom, on the inner lateral surface of the inner tube.

11. The hydraulic vibration damper of claim 9 wherein the inner tube includes an overflow passage via which the piston rod-side working space is hydraulically connected to a damping force adjustment device.

12. The hydraulic vibration damper of claim 10 wherein the piston rod-side working space and the piston rod-remote working space are connected via the overflow passage to the annular space disposed between the inner tube and the outer tube, wherein the outer tube has connecting passages via which the damping force adjustment device, which is disposed outside the working spaces, is hydraulically connected to the annular space.

13. The hydraulic vibration damper of claim 11 wherein, by way of the damping force adjustment device, a damping force of the hydraulic vibration damper is variable steplessly.

14. The hydraulic vibration damper of claim 11 wherein, by way of the damping force adjustment device, a damping force of the hydraulic vibration damper is variable according to predetermined discrete damping force characteristics.

15. The hydraulic vibration damper of claim 11 wherein the damping forces of the rebound and compression stops in end regions of the working piston movement are coordinated with damping forces produced by the damping force adjustment device such that a harmonic damping force profile results over a total axial movement region of the working piston.

16. The hydraulic vibration damper of claim 11 wherein the damping forces of the rebound and compression stops in end regions of the working piston movement are coordinated with damping forces produced by the damping force adjustment device.

17. The hydraulic vibration damper of claim 9 wherein the first auxiliary piston has a hollow cylindrical pot shape with a bottom on which an end of a first spring is supported, and with a cylinder jacket that extends axially in a direction of a sealing and guide pack starting from the bottom, wherein the cylinder jacket is guided in a first contact region, which is spaced apart from the bottom, on the inner lateral surface of the inner tube, wherein the pot-shaped first auxiliary piston includes, at an end facing away from the bottom, a sealing element that interacts with the inner wall of the inner tube in a sealing manner.

18. The hydraulic vibration damper of claim 1, wherein the second radial bores connect the piston rod-remote working space in the region between the second auxiliary piston and a damper bottom to the annular space.

19. The hydraulic vibration damper of claim 6, wherein the second radial bores connect the piston rod-remote working space in the region between the second auxiliary piston and a damper bottom to the annular space.

20. The hydraulic vibration damper of claim 9, wherein the second radial bores connect the piston rod-remote working space in the region between the second auxiliary piston and a damper bottom to the annular space.

* * * * *